(12) United States Patent
Franco et al.

(10) Patent No.: US 6,481,090 B1
(45) Date of Patent: Nov. 19, 2002

(54) INSTALLATION AND REMOVAL OF ENERGIZED PERMANENT MAGNETS IN PERMANENT MAGNET ROTORS

(75) Inventors: Alberto Franco, Hazlet, NJ (US); Spyro Pappas, Fort Lee, NJ (US); Michael Gheorghiu, Forest Hills, NY (US); Michael J. Lubas, Basking Ridge, NJ (US)

(73) Assignee: Electric Boat Corporation, Groton, CT (US)

( * ) Notice: Subject to any disclaimer, the term of this patent is extended or adjusted under 35 U.S.C. 154(b) by 2 days.

(21) Appl. No.: 09/891,073

(22) Filed: Jun. 25, 2001

(51) Int. Cl.[7] .............................................. H02K 15/02
(52) U.S. Cl. ........................................ 29/598; 29/596
(58) Field of Search ..................... 29/596, 598, 607, 29/732; 310/42

(56) References Cited

U.S. PATENT DOCUMENTS

| | | | |
|---|---|---|---|
| 3,401,280 A | 9/1968 | Lackey et al. ............ 29/598 X |
| 4,290,190 A | 9/1981 | Arnold ........................ 29/596 |
| 4,439,704 A | 3/1984 | Adelski et al. ............ 29/598 X |
| 4,549,341 A | * 10/1985 | Kasabian .................... 29/598 |
| 4,918,802 A | 4/1990 | Schaefer ...................... 29/598 |
| 4,953,284 A | 9/1990 | Hammer et al. ............... 29/596 |
| 4,955,128 A | 9/1990 | Sogabe et al. ................ 29/596 |
| 5,392,503 A | 2/1995 | Stavale ..................... 29/426.5 |
| 5,735,038 A | 4/1998 | Sakashita et al. ......... 29/596 X |
| 5,774,976 A | * 7/1998 | Stark ........................... 29/732 |
| 5,831,365 A | 11/1998 | Keim et al. ............... 29/598 X |
| 5,952,756 A | * 9/1999 | Hsu et al. ................. 310/42 X |
| 5,992,007 A | * 11/1999 | Morii et al. ................... 29/598 |
| 6,047,460 A | 4/2000 | Nagate et al. ................ 29/598 |
| 6,047,461 A | 4/2000 | Miura et al. .................. 29/598 |

* cited by examiner

Primary Examiner—Robert M. Fetsuga
(74) Attorney, Agent, or Firm—Baker Botts, LLP

(57) ABSTRACT

In the embodiments described in the specification, a permanent magnet machine has a stator assembly containing a circular array of stator windings and a rotor assembly containing passages for permanent magnets and supported for rotation within the stator windings. The rotor assembly contains dummy magnet blocks in each passage during assembly of the rotor assembly in the stator assembly and a loading fixture containing energized permanent magnets is aligned with each passage in succession into which it supplies a row of permanent magnets while the dummy magnet blocks are removed by a retrieving fixture at the opposite end of the passage. After the permanent magnets have been inserted an end cover is mounted at each end of the passage to hold the energized permanent magnets in position.

9 Claims, 1 Drawing Sheet

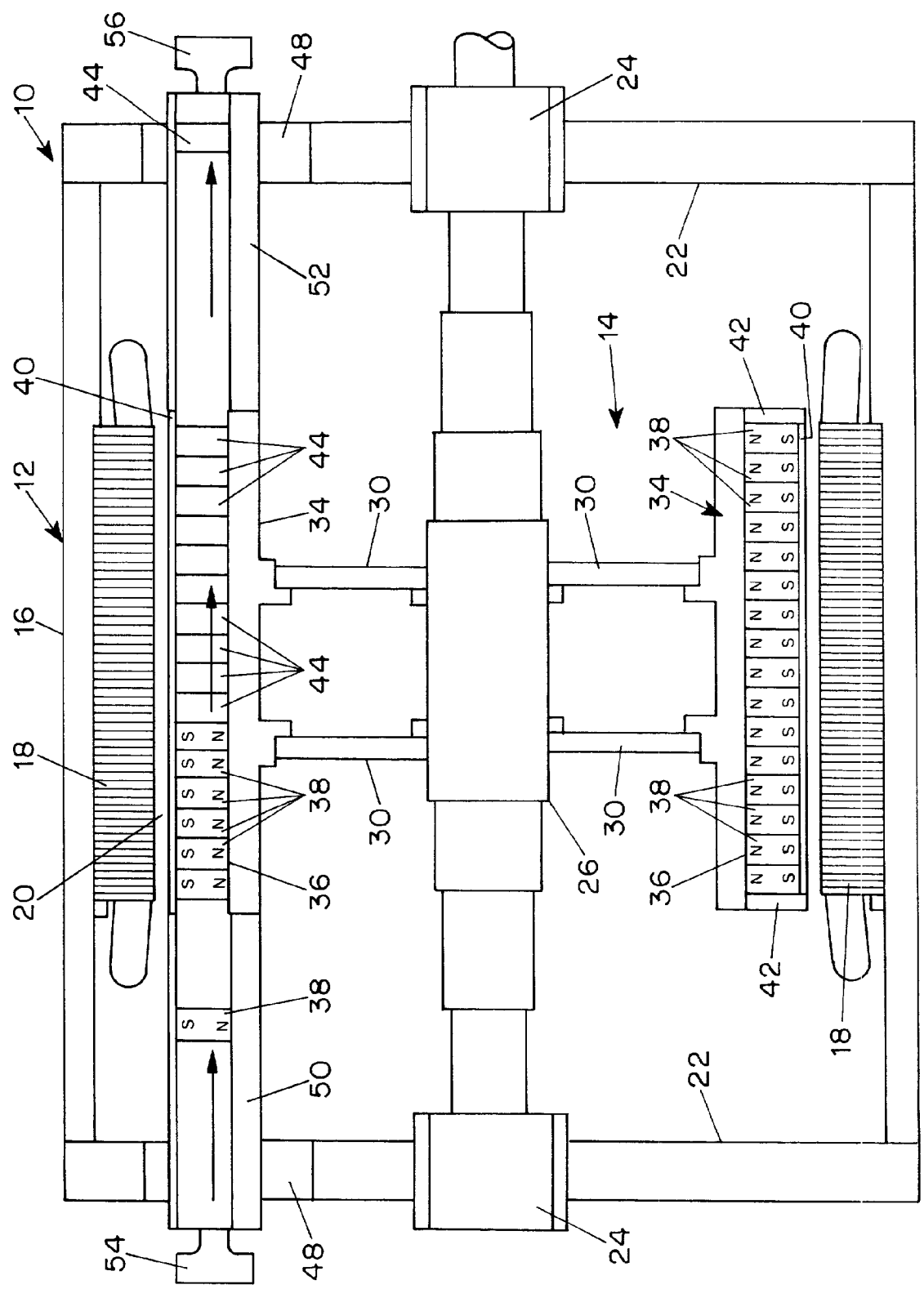

INSTALLATION AND REMOVAL OF ENERGIZED PERMANENT MAGNETS IN PERMANENT MAGNET ROTORS

BACKGROUND OF THE INVENTION

This invention relates to methods and arrangements for installing and removing rotors in permanent magnet machines.

Installation and removal of rotor assemblies containing energized permanent magnets in the stators of large sized permanent magnet machines requires special and quite expensive fixtures in order to properly guide and hold the rotor assembly centered while the rotor is being inserted within the stator assembly. This is necessary to prevent the rotor from being drawn by the energized permanent magnets laterally toward the stator assembly during insertion and removal because the energized permanent magnets generate high magnetic fields producing attraction and/or repulsion forces.

For small or medium sized permanent magnet machines the rotor can contain magnets which are not energized until after the assembly has been completed if the core stack length and the number of magnets per pole are amenable to magnet energization following assembly. This is normally not practical, however, for large permanent magnet machines and, for such machines, the fixtures required for mounting a rotor containing energized permanent magnets in a stator are generally unique to a particular machine design, are expensive, and must accompany the machine for field disassembly since rotor removal requires the use of the same fixtures as for the assembly process. If a problem such as a winding short occurs in a permanent magnet machine or if periodic maintenance is required the machine must typically be partially or fully disassembled using the unique fixture.

The Keim et al. U.S. Pat. No. 5,831,365 discloses a detachable magnet carrier for a permanent magnet rotor in which a magnet carrier containing a linear array of permanent magnets can be pushed into a groove in a rotor after the rotor has been installed in a permanent magnet machine and attached to the rotor structure by screws.

The Adelski et al. U.S. Pat. No. 4,439,704 discloses a method for manufacturing a rotor in which individual permanent magnets are inserted in succession into a slot extending through the rotor laminations from one end to the other of the rotor until the slot has been filled and the opposite ends of the rotor are covered by shorting ring segments so that each row of magnets is covered at one end by a shorting ring segment.

U.S. Pat. No. 6,047,461 to Miura et al. discloses the manufacture of a permanent magnet rotor in which dummy magnet pieces are used to facilitate the fitting of a steel sleeve over permanent magnets and are then removed after assembly of the rotor.

SUMMARY OF THE INVENTION

Accordingly, it is an object of the present invention to provide a method and arrangement for installation and removal of energized permanent magnets in permanent magnet rotors which overcomes disadvantages of the prior art.

Another object of the present invention is to provide a method and arrangement for installation and removal of energized permanent magnets in permanent magnet rotors in a simple and relatively inexpensive manner.

These and other objects of the invention are attained by mounting a rotor containing nonmagnetic dummy magnet blocks into a stator assembly and then replacing the nonmagnetic dummy magnet blocks with energized permanent magnets. Preferably the nonmagnetic dummy blocks are slidably supported in a passage extending parallel to the axis of the rotor and a loading fixture containing permanent magnets is aligned with the passage containing the dummy magnet blocks. The permanent magnets are then pushed into the passage and the dummy magnet blocks are removed from the opposite end of the passage.

Installation of permanent magnets in this manner is carried out in succession in each magnet row of the rotor until all of the dummy magnet blocks have been completely replaced by permanent magnets, after which the passages are closed at each end, for example by mounting end plates at the ends of the passages in the rotor assembly to retain the permanent magnets in position in the rotor. Thus, by first mounting a rotor with dummy magnet blocks in passages in the rotor of a permanent magnet machine, then installing the rotor in the stator of the machine, and then replacing the dummy blocks with permanent magnets while removing the dummy magnet blocks, the necessity for using complex and expensive rotor positioning fixtures for installing the rotor is avoided. Moreover, if it is necessary to remove and replace permanent magnets in the rotor such replacement can be accomplished without disassembly of the permanent magnet machine.

BRIEF DESCRIPTION OF THE DRAWING

Further objects and advantages of the invention will be apparent from a reading of the following description in conjunction with the accompanying drawing which is a schematic longitudinal sectional view illustrating a representative embodiment of an arrangement for installation and removal of energized permanent magnets in a permanent magnet machine in accordance with the invention.

DESCRIPTION OF PREFERRED EMBODIMENTS

In the typical embodiment of the invention shown in the drawing, a permanent magnet machine 10 includes a stator assembly 12 surrounding and enclosing a rotor assembly 14 designed to contain rows of permanent magnets. The stator assembly includes a cylindrical housing member 16 supporting a circular array of stator coils 18 providing a cylindrical opening 20 in which the rotor assembly 14 is supported. The stator housing also includes two end walls 22 supporting bearings 24 in which an axial shaft 26 of the rotor assembly 14 is rotably mounted. A plurality of support members 30 extend radially outwardly from the shaft 26 to support magnet holders 34 having passages 36 extending parallel to the rotor axis so as to hold rows of permanent magnets 38 at positions in which their magnetic fields interact with the stator coils 18 as the rotor rotates in the cylindrical opening 20 adjacent to the stator coils. Each passage 36 has a wedge profile 40 along its outer surface and is provided with a removable end cover 42 at each end to hold the magnets in position in the passage.

In order to permit the rotor to be installed in the permanent magnet machine without requiring special fixtures in accordance with the invention, a plurality of nonmagnetic dummy magnet blocks 44 are inserted in the passage 36 in each magnet holder 34 so that the blocks are longitudinally slidable in the passage. After the rotor assembly 14 has been installed in the permanent magnet machine 10 with the dummy magnet blocks in place, the rotor assembly 14 is rotated to a position in which a passage 36 in a magnet support 34 is aligned with windows 48 in the end plates 22 of the housing.

A loading fixture 50 is then inserted through the window 48 in one end plate so that it is aligned with the passage 36 and a retrieving fixture 52 is inserted through the window 48 in the end plate 22 at the opposite end and aligned with the passage. With the fixtures thus aligned with the passage 36, energized permanent magnets 38 are pushed into the passage in succession by a linear displacement device 54 in the loading fixture 50 while the dummy magnet blocks 44 are withdrawn from the opposite end of the passage by a linear displacement device 56 in the retrieving fixture 52. Preferably, the energized permanent magnets 38 are inserted individually into the passage but, if desired, more than one, or even the entire row, may be inserted in a single operation of the loading fixture and the same number of dummy magnet blocks may also be withdrawn at the same time.

After all of the dummy magnet blocks 44 in a passage 36 have been replaced by energized permanent magnets 38, the end covers 42 are mounted at the opposite ends of the passage so as to hold the row of permanent magnets in the desired fixed position in the magnet holder 34. The rotor is then turned to align another passage 36 containing a row of dummy magnet blocks with the loading fixture 50 and the retrieving fixture 52 and the above described process is repeated to replace the dummy magnet blocks in that passage with energized permanent magnets and this process is repeated until all of the passages 36 in the rotor have been filled with energized permanent magnets.

In this way, a rotor assembly can be mounted in a permanent magnet machine without requiring a special fixture and energized permanent magnets can then be inserted into the rotor so as to avoid the difficulties faced when mounting a rotor containing energized permanent magnets in a machine. If disassembly is required for any reason, for example for repair or replacement of the rotor assembly, the energized permanent magnets are removed from the rotor in a similar manner by inserting dummy magnet blocks from the loading fixture into each passage and withdrawing the energized permanent magnets using the retrieval fixture.

Although the invention has been described herein with reference to specific embodiments, many modifications and variations therein will readily occur to those skilled in the art. Accordingly, all such variations and modifications are included within the intended scope of the invention.

We claim:

1. An arrangement for removing energized permanent magnets from a rotor of a permanent magnet machine having passages containing energized permanent magnets comprising a loading fixture containing dummy magnet blocks aligned with the passage and a retrieval fixture aligned with the opposite end of the passage for removing energized permanent magnets.

2. An arrangement for assembling a permanent magnet machine having a rotor with passages containing dummy magnet blocks comprising a loading fixture containing energized permanent magnets aligned with a rotor passage for insertion of the energized permanent magnets into the passage and a retrieval fixture aligned with the passage for withdrawing dummy magnet blocks from the opposite end of the passage.

3. A method for disassembling a permanent magnet machine containing a rotor having a plurality of passages containing rows of energized permanent magnets comprising inserting a plurality of dummy magnet blocks into one end of each passage and withdrawing energized permanent magnets from the opposite end of each passage until all of the passages are filled with a row of dummy magnet blocks, and removing the rotor from the machine.

4. A method according to claim 3 including inserting a row of dummy magnet blocks into each of the plurality of passages in the rotor assembly in succession and withdrawing energized permanent magnets from the opposite end of each of the passages in succession.

5. A method for assembling a permanent magnet machine comprising:

installing in a permanent magnet machine a rotor assembly having a plurality of passages containing rows of unenergized dummy magnet blocks; and after the rotor assembly has been installed in the machine, inserting energized permanent magnets into one end of each passage and removing dummy magnet blocks from the opposite end of the passage to provide a row of energized permanent magnets in the passage.

6. A method according to claim 5 including mounting end covers at the opposite ends of each passage after insertion of the energized permanent magnets into the passage.

7. A method according to claim 5 wherein the energized permanent magnets are inserted one at a time into the passage.

8. A method according to claim 5 wherein a plurality of energized magnets is inserted into the passage at the same time.

9. A method according to claim 5 wherein each passage has a retaining wedge for retaining the energized permanent magnets and including the step of sliding the energized permanent magnets into the passage so that they are retained by the retaining wedge.

* * * * *